Oct. 21, 1969 J. MARCOVITCH 3,473,358
PROFILING OF WORKPIECES THAT ARE FIGURES OF REVOLUTION
Filed Dec. 19, 1966 2 Sheets-Sheet 1

INVENTOR
JACOB MARCOVITCH
By Young & Thompson
ATTYS.

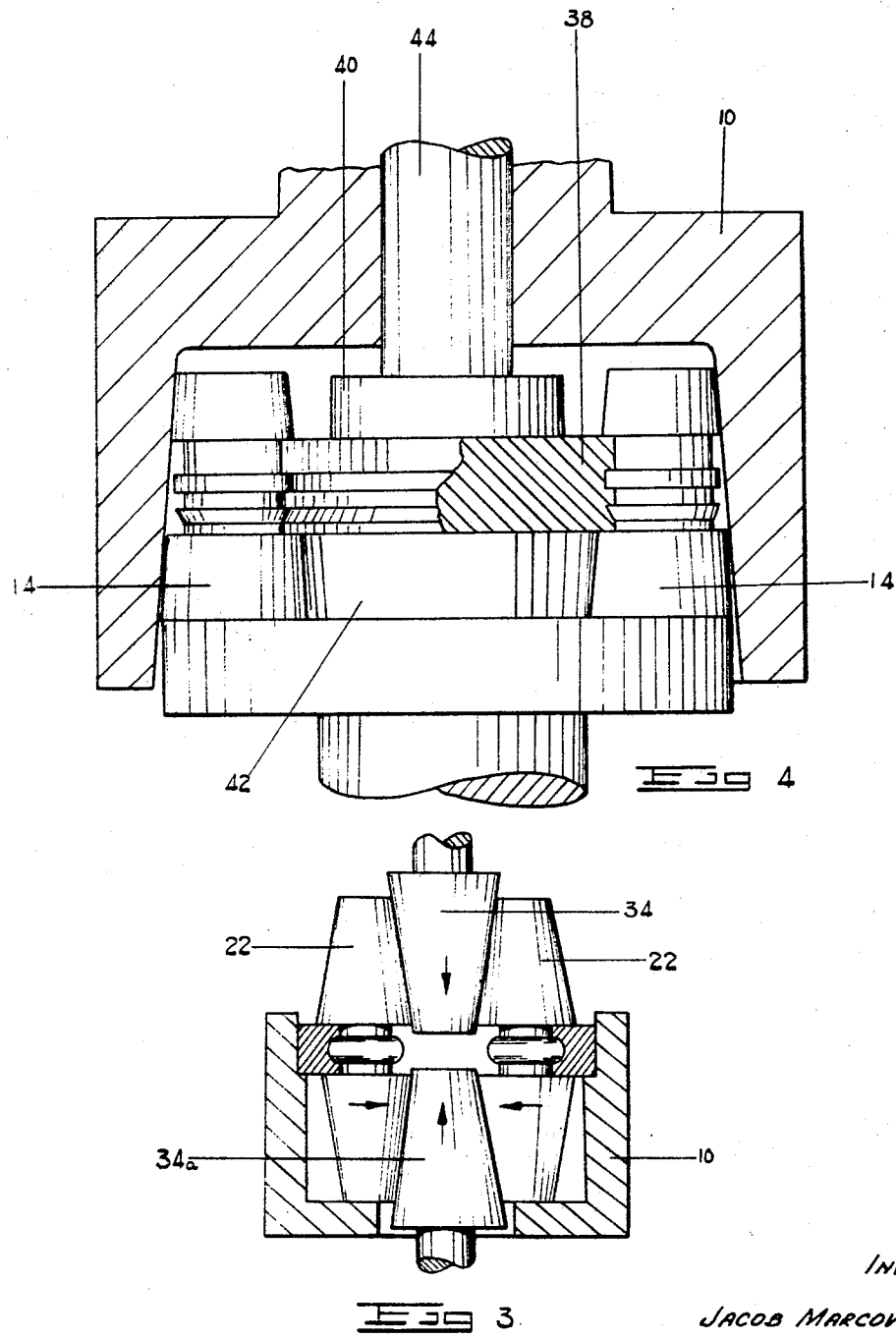

United States Patent Office 3,473,358
Patented Oct. 21, 1969

3,473,358
PROFILING OF WORKPIECES THAT ARE
FIGURES OF REVOLUTION
Jacob Marcovitch, Braamfontein, Johannesburg, Republic of South Africa, assignor to Rotary Profile Anstalt, Vaduz, Liechtenstein
Filed Dec. 19, 1966, Ser. No. 603,021
Claims priority, application Republic of South Africa, Jan. 3, 1966, 66/12
Int. Cl. B21d 3/06, 19/14
U.S. Cl. 72—121        7 Claims

ABSTRACT OF THE DISCLOSURE

A machine for profiling workpieces that are figures of revolution by rolling, in which a series of tapered mandrels are arranged radially around a workpiece, and a complementally tapered backing member is engaged with the mandrels and the mandrels and backing member are moved relatively together in the axial direction, while the workpiece, mandrels and backing member are relatively rotated. The backing member may be a cup with a tapered inner wall, or a solid tapered member. The workpieces may be solid or annular.

---

This invention relates to the profiling of workpieces that are figures of revolution and its object is to provide a simple and inexpensive profiling method and machine.

The invention provides in essence a machine for profiling a workpiece that is a figure of revolution, comprising a backing member defining a frusto-conical track and a plurality of mandrels adapted to roll on the track while pressing on a face of a workpiece to be profiled, each mandrel having a central zone that is recessed and profiled to press on the workpiece and frusto-conical ends that are adapted to roll in line contact on the track of the backing member, the combined length of the ends of each mandrel being longer than its recessed central zone and the taper of the mandrel ends being complemental to that of the track on the backing member; means to support the workpiece with its axis coincident with that of the track on the backing member; means to rotate backing member relative to the workpiece about this axis to cause the mandrels to roll on the backing member and the workpiece, means to force the backing member relatively towards the workpiece parallel to the said axis, slot that the mandrels are forced radially towards the workpiece to profile it and simultaneously move laterally higher relative to the track; and stop means to prevent movement of the mandrels relative to the workpiece parallel to the said axis.

The workpiece may be a solid body that is a figure of revolution body, in which case the mandrels are arranged radially around it. On the other hand, the workpiece may be annular. If so, and the face to be profiled is the outer face, the mandrels are arranged around the periphery of the workpiece, and the cavity is filled with a supporting plug to resist distortion of the workpiece under radially inward force. If the inner face is to be profiled, the mandrels are arranged within the cavity of the workpiece, and the outer face of the workpiece is butt-ressed by a supporting ring. However, the plug or the ring may also be profiled, with formations such as radially undulating formations (e.g. being provided with gear teeth); so that it is possible to profile rings on both the inner and outer surfaces.

The backing member will be annular or cup-shaped where the mandrels surround the workpiece, and will be a solid frusto-cone when the mandrels are within the workpiece.

Figure 1:
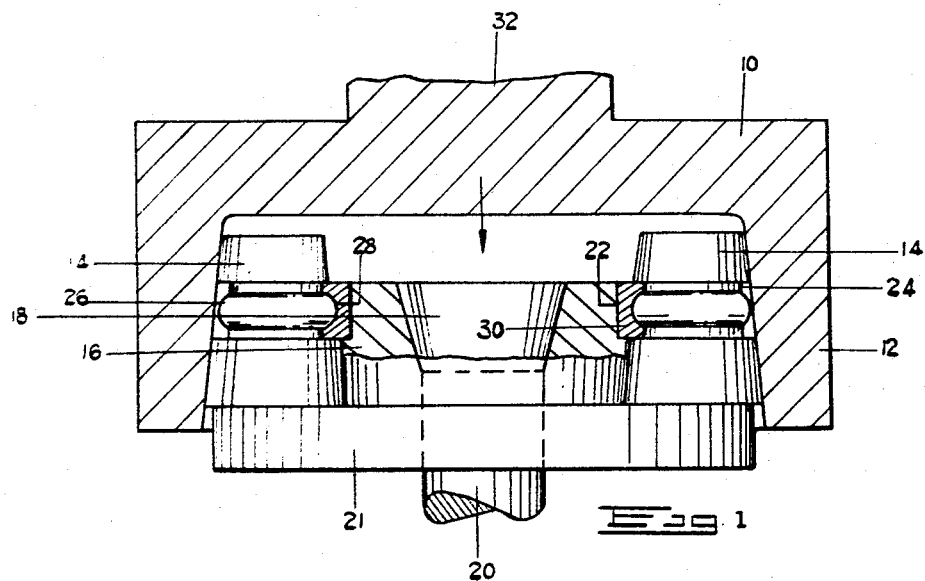
Figure 2:
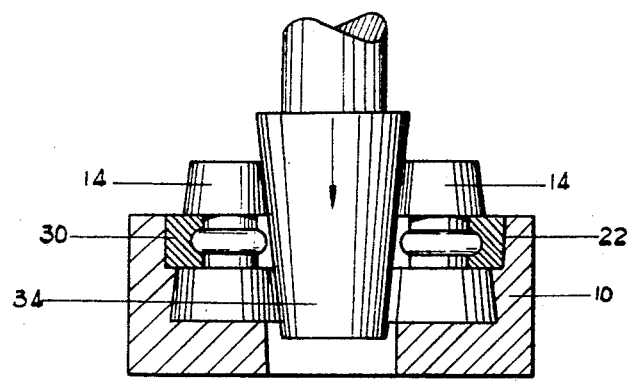

Four embodiments of the invention are illustrated in the accompanying drawings, in which:

FIGURE 1 is a longitudinal section (partly in full) through one embodiment, for making rings that are externally profiled, FIGURE 2 is a similar view of an embodiment for making rings that are profiled on the inside, FIGURE 3 is a similar view of a "duplex" arrangement, and FIGURE 4 is a similar view of an embodiment for making solid workpieces.

In each of the figures of the drawings, there is a massive member 10 in the form of a cup. In FIGURE 1, the skirt 12 of the cup, which forms a backing member for the mandrels 14, is internally tapered to contain a series of complementally tapered mandrels 14 that are arranged loosely around the periphery of a supporting plug or collar 16 with a tapered bore that mates with a taper plug 18 projecting downwardly to form a shank 20. The inner surface of the cup thus provides a track on which the ends of the mandrel roll. The collar is mounted on a massive base 21, through which the shank passes. The lower part of the collar is tapered to correspond with the taper of the mandrels, while the upper part is recessed at 22 to receive and support an annular blank which initially fits easily into the recess. The blank is conveniently of square cross-section, the volume being slightly more than the volume of the finished ring. As is evident from the drawings, its axis is coincidental with that of the track on the cup.

The central zone 24 of each mandrel is recessed and is shaped, within the recess, complementally to the profile to be applied to the workpiece. Thus, in FIGURE 1 the floor of the recess is formed with a half-round rib 26 to impress a complemental groove 28 into the outer periphery of the workpiece 30.

In use, the base 21 is rigidly mounted, for instance by clamping the shank on a support. The workpiece 30 is located within the recess 22 and the series of mandrels spaced radially around it, resting on the base 21 to prevent them from moving axially relative to the workpiece. The central zone 24 of each mandrel is juxtaposed to the workpiece.

The cup 10 is then superimposed over the assembly, for the tapers of the mandrels and the skirt to mate. The cup is rotated, and simultaneously heavy downward pressure is exerted upon the cup through a post 32 that bears on the upper face of the cup. The pressure is transmitted to the mandrels through the line contact between the mating surfaces of the mandrels and the cup, and the radially inward component of the forces on the mandrels forces the mandrels into profiling contact with the workpiece, as the mandrels orbit around it. This causes the material of the workpiece to flow plastically, to fill the recessed central zones 24 of the mandrels. The contour of the mandrels is thus imposed on the outer surface of the workpiece.

When the workpiece has been fully deformed (a position which can be detected by the degree of penetration of the mandrels relatively into the cup, or by full penetration which brings the operation to an end), the cup is withdrawn, whereupon the mandrels are released from the workpiece, which can be extracted from the recess 22.

A high polish is produced on the workpiece which emerges from the machine precisely finished as to the inside and outside diameters, and as to one radial face. The other radial face, is equally precise and is in fact a mirror image of its mating surface under the heavy pressure used.

In the embodiment of FIGURE 2, much the same elements are seen as are seen in FIGURE 1. However, as the workpiece must be profiled on the inner face, the recess 22 is found in the cup 10. The backing member for the mandrels in this case is a frusto-conical member 34 tapered complementally to the taper of the mandrels 14. The operation of the machine is the same as that of the machine already described: the cup is mounted for rotation on a rigid support, the workpiece 30 is put into the recess 22, the mandrels are spaced around its inner surface, the cup is rotated about its axis, and the frusto-cone 34 is forced in between the mandrel to press them outwardly into profiling contact with the workpiece.

In FIGURE 3, the mandrels 22 are double-tapered. Two opposed frusto-conical backing members 34, 34a are used, being simultaneously and symmetrically forced towards each other to expand the mandrels into profiling contact with the workpiece. The operation is, obviously, the same at that of FIGURE 2, but the machine is better balanced as there is no unbalanced component of force acting in the axial direction, if the frusto-cones advance in unison.

In FIG. 4, the mandrels 14 bear on the inner face of the cup 10, as in FIGURE 1. However, the workpiece 38 is solid, and is clamped between opposed cheeks 40, 42, the cheek 40 being fast with a shaft 44 that is rotated.

It is desirable that the mandrels be held spaced apart, as they converge on the workpiece. To this end, means such as a cage with slots may be provided to prevent any displacement of the mandrels other than radially inwardly.

It will be noticed from the drawings that in each embodiment the combined lengths of the tapered ends of the mandrels is greater than the length of the recessed central profiling zone. This feature leads to the advantage that large pressures can be imposed on the workpiece along the relatively short length of the central zone, while lesser pressures are operative along the greater length of the mandrel ends. The stresses in the machine are kept correspondingly low, while allowing intense pressure to be exerted on the workpiece to cause extensive deformation.

I claim:
1. A machine for profiling a workpiece that is a figure of revolution, comprising a backing member defining a frusto-conical track and a plurality of mandrels adapted to roll on the track while pressing on a face of a workpiece to be profiled, each mandrel having a central zone that is recessed and profiled to press on the workpiece and frusto-conical ends that are adapted to roll in line contact on the track of the backing member, the combined length of the ends of each mandrel being longer than its recessed central zone and the taper of the mandrel ends being complemental to that of the track on the backing member; means to support the workpiece with its axis coincident with that of the track on the backing member; means to rotate the backing member relative to the workpiece about said axis to cause the mandrels to roll on the backing member and the workpiece, means to force the backing member relatively towards the workpiece parallel to said axis, so that the mandrels are forced radially towards the workpiece to profile it and simultaneously move laterally higher relative to the track; and stop means to prevent movement of the mandrels relative to the workpiece parallel to said axis.

2. The machine of claim 1 in which the backing member is cup-shaped and the track is provided on its inner surface, the workpiece being annular and the means to support it being a plug on which the inner face of the workpiece is adapted to bear, the mandrels being arranged to profile the outer face of the workpiece.

3. The machine of claim 2 in which the backing surface of the plug is provided with radially undulating profiling formations to provide complemental formations on the inner face of the workpiece.

4. The machine of claim 1 in which the workpiece is annular and the means to support it is a body on which one of its circumferential faces is adapted to bear, the body being provided with radially undulating profiling formations to provide complemental formations on the contacting face of the workpiece.

5. The machine of claim 1 in which the backing member is solid and the means to support the workpiece is a cup-shaped body, the workpiece being annular and its outer face being adapted to bear on the inner surface of the cup-shaped body, the mandrels being arranged to profile the inner face of the workpiece.

6. The machine of claim 5 in which each mandrel is double-tapered, and including two opposed and axially aligned backing members on each of which a frusto-conical end of each mandrel is adapted to roll; and including means to move the two backing members together in the direction of their axes.

7. The machine of claim 1 in which the stop means to prevent movement of the mandrels relative to the workpiece in the direction of the axes of the backing member and workpiece has a surface on which an end of each mandrel is adapted to bear.

References Cited
UNITED STATES PATENTS

| | | | |
|---|---|---|---|
| 1,550,135 | 8/1925 | Wing | 72—122 |
| 2,595,910 | 5/1952 | Wallace | 72—124 |
| 2,861,623 | 11/1958 | Franck | 72—124 |
| 3,011,539 | 12/1961 | Hendrickson | 72—117 |
| 3,191,417 | 6/1965 | Adam | 72—126 |
| 3,354,680 | 11/1967 | Jacobsen | 72—126 |

MILTON S. MEHR, Primary Examiner

U.S. Cl. X.R.

72—106, 122, 123, 124, 126